Feb. 25, 1969   TOSHIO YOSHIMURA   3,429,422
BELT CONVEYOR
Filed Feb. 2, 1967   Sheet 1 of 11

INVENTOR.
TOSHIO YOSHIMURA
BY
ATTORNEYS

United States Patent Office 3,429,422
Patented Feb. 25, 1969

3,429,422
BELT CONVEYOR
Toshio Yoshimura, Naokata, Japan, assignor to Fuji
Conveyor Kabushiki Kaisha, Naokata, Japan
Filed Feb. 2, 1967, Ser. No. 613,602
Claims priority, application Japan, Oct. 13, 1966, 41/
94,708, 41/94,709; Dec. 2, 1966, 41/78,616, 41/78,617,
41/78,618; Dec. 26, 1966, 41/84,694, 41/84,695
U.S. Cl. 198—184                                15 Claims
Int. Cl. B65g 15/08

ABSTRACT OF THE DISCLOSURE

A belt conveyor system in which an endless belt travels over and is driven by a pair of spaced pulleys. As it passes over the pulleys, the belt is flat and between the pulleys it is converted into a tubular shape by rollers with one longitudinal edge of the belt arranged in overlapping contacting relationship with the other longitudinal edge. A feed chute charges material into the tubular-shaped belt at one end and as the belt is transformed from the tubular to the flat shape, the materials are discharged. For the extent of its tubular shape, the belt is supported by rollers within a tubular cover.

---

This invention relates to a belt conveyor system.

An object of the present invention is to provide a belt conveyor system which is most suited for conveyance of pulverulent and fine granular material.

Another object of the present invention is to provide a belt conveyor system capable of conveying a large amount of pulverulent or like material regardless of its small volume.

A further object of the present invention is to provide a belt conveyor system wherein introduction of raindrops or adhesion of dusts and dirt to the pulverulent or like material being conveyed, not to mention the belt itself, may be avoided.

A further object of the present invention is to provide a belt conveyor system wherein flying off or spillage of the pulverulent or like material being conveyed may be avoided.

A further object of the present invention is to provide a belt conveyor system wherein upsetting or wandering of the belt may be avoided and wherein the direction of travel of the belt may be varied as required.

A further object of the present invention is to provide a belt conveyor system wherein the flat belt is adapted to be flexed to a tubular configuration with its both edges lapped one over the other due to the construction of such rollers and the disposition of the same along the edges of the running belt, and wherein the edges of the belt flexed to a tubular configuration may be maintained in the lapped state positively.

A further object of the present invention is to provide a belt conveyor wherein the tubular configuration of the belt may be varied freely in conformity to the state of the loose material being conveyed on the belt conveyor and the material may be conveyed smoothly.

A further object of the present invention is to provide a belt conveyor system wherein three separate carrier rollers are provided instead of a single carrier roller or idler having a concave contact face to be abutted on the periphery of the flexed belt so that the number of revolutions of each roller will not be the same due to the difference of the load sustained by each roller, and thereby a closer contact between each part of the belt and each carrier roller or idler may be ensured.

A further object of the present invention is to provide a belt conveyor system so made that dust and dirt will not be introduced from between the separate carrier rollers or idlers.

A further object of the present invention is to provide a belt conveyor system provided with a carrier roller adapted to positively cooperate with a slot formed on the underside of the belt to prevent wandering of the belt.

A further object of the present invention is to provide a belt conveyor system provided with a snap roller which may lend itself to smooth operation of the belt conveyor even if the belt is provided on its upper surface with a number of fin plates adapted to prevent reversal of the material being conveyed on the steep slope.

A still further object of the present invention is to provide a belt conveyor system so made that articles to be transferred may be supplied to the portion of the belt flexed to a tubular configuration in a suitable amount so that the belt may be flexed to a tubular configuration without hindrances.

With these objects in view and other objects to be set forth hereinafter in the following specification, the present invention will now be described in detail with reference to the accompanying drawings showing certain embodiments thereof.

Figure 1:
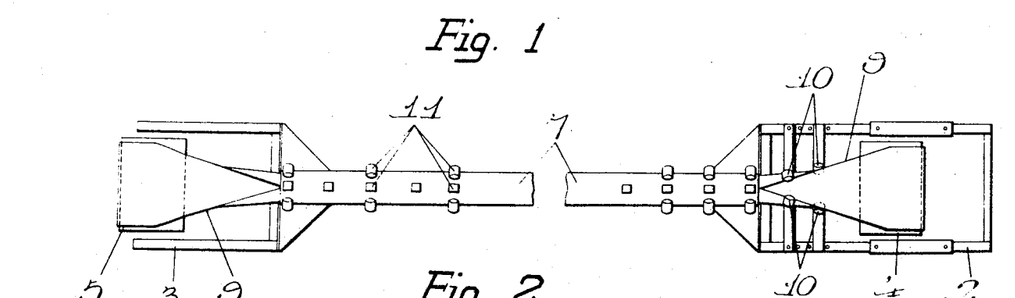
FIG. 1 is a plan view of the belt conveyor system according to the present invention.
Figure 2:
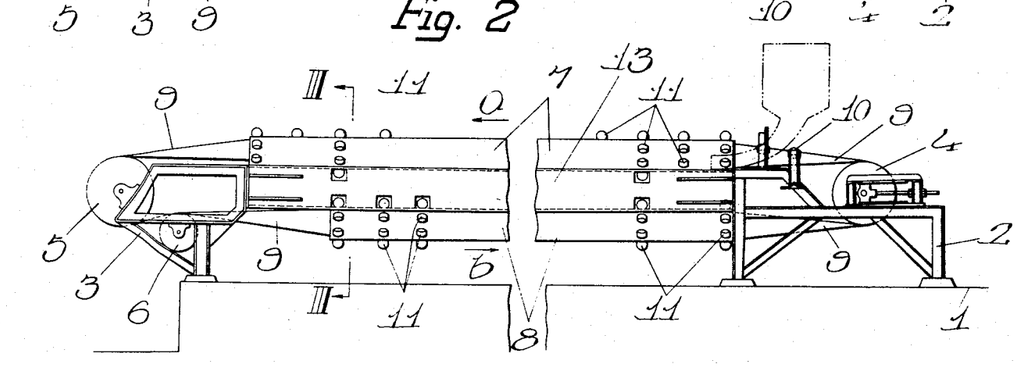
FIG. 2 is a side elevation of the same.
Figure 3:
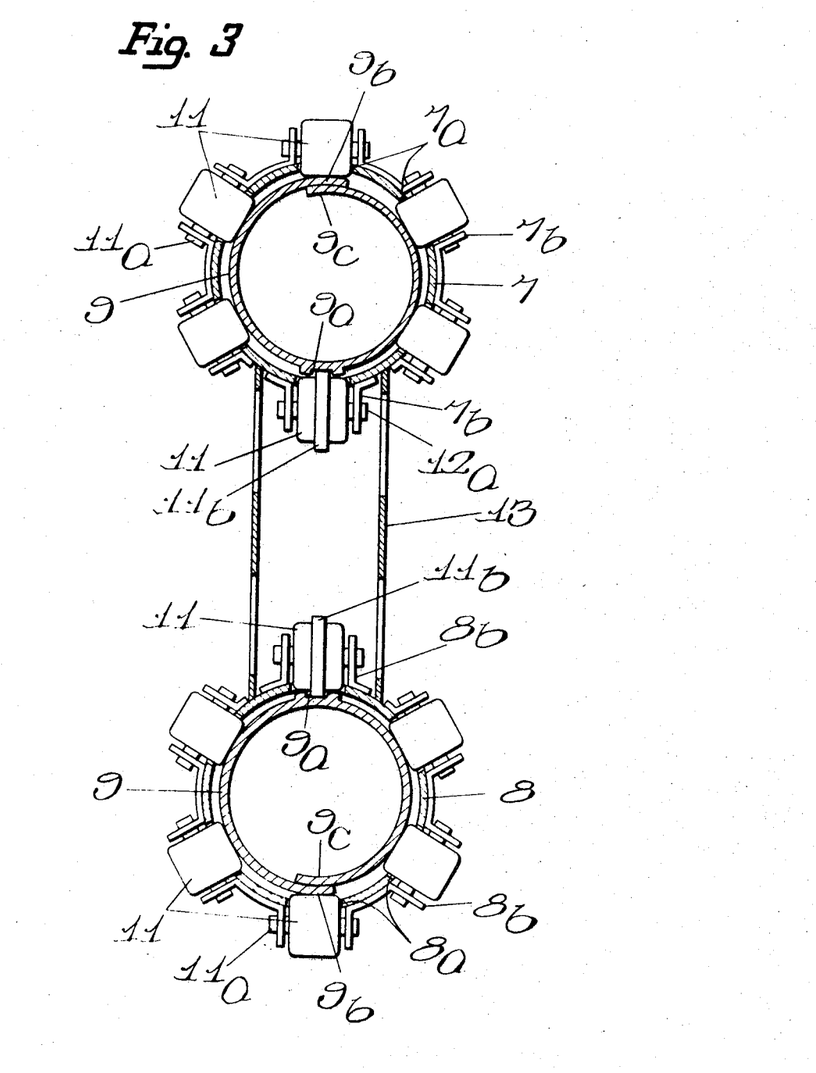
FIG. 3 is a section taken on the line III—III of FIG. 2.

In FIGS. 1 to 3, numeral 1 indicates a bed plate, numerals 2 and 3 indicate support frames, numeral 4 indicates driven pulley, numeral 5 indicates driving pulley, numerals 7 and 8 indicate tubular outer covers or guide frames for the running belt, numeral 9 indicates a belt, numeral 10 indicates belt flexing rollers, and numeral 12 a feed chute.

Support frames 2 and 3 are provided on the bed plate 1 to the front and back, and tubular outer covers or guide frames 7, 8 are monuted to the upper and lower parts of the frames 2, 3.

Driving pulley 5 is rotated at reduced speed by means of a prime mover via suitable gearing and belt 9 is mounted over the driving pulley 5 and driven pulley 4 via a tension pulley 6.

On the periphery of the upper and lower tubular covers or guide frames 7, 8 are provided a number of groups of carrier rollers 11, 11—each group comprising as for instance six carrier rollers each having part of its contacting face projected into the inside of the tubular cover or guide frame 7 or 8 by way of perforations 7a or 8a bored circumferentially at equiangularly spaced apart intervals on the tubular cover or guide frame 7 or 8. One of the carrier rollers 11 of each group is formed with larger diameter portion 11b which may be received into a slot 9a provided centrally of the lower surface of the belt 9 as illustrated in FIG. 3.

Each of the carrier rollers 11 has its axis 11a carried by means of a pair of brackets 7b, 8b secured to the periphery of the tubular covers or guide frames 7, 8 which in turn are secured together by means of support plates 13 mounted at equally spaced apart intervals between the support frames 2, 3.

Figure 4:
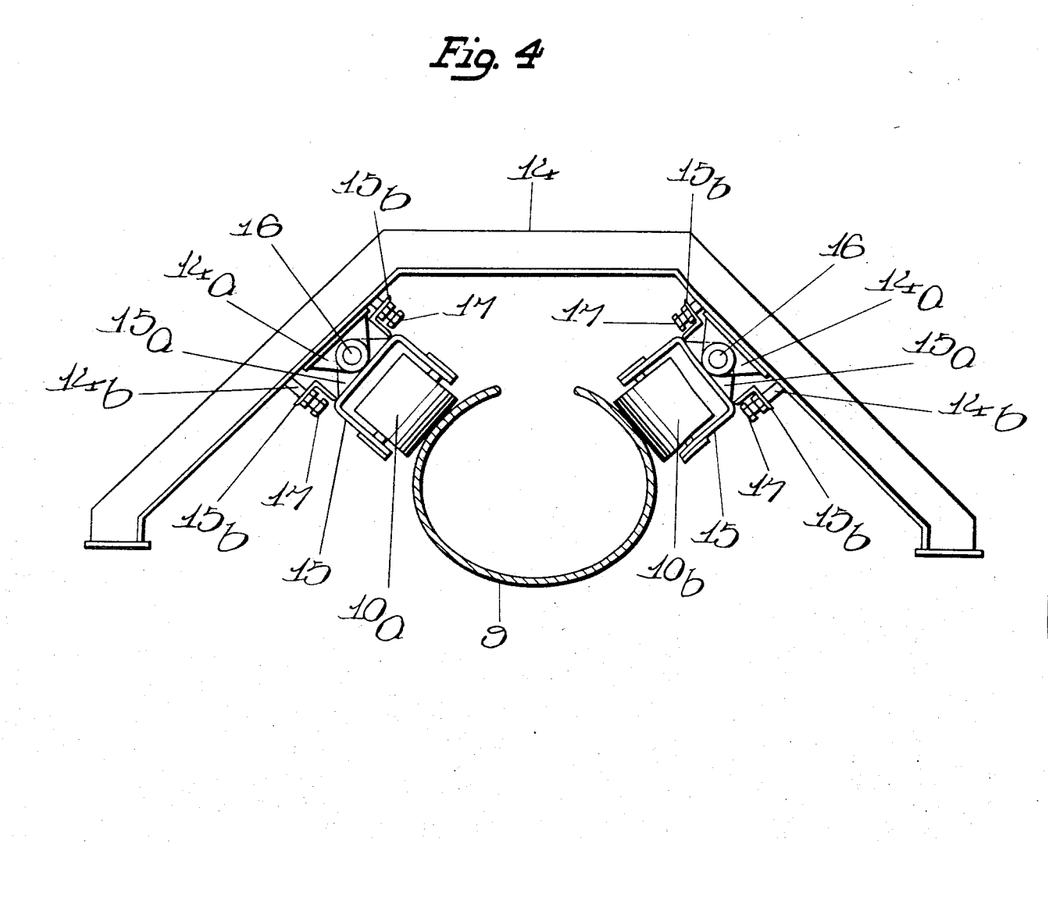
FIG. 4 is a front view showing an embodiment of the belt flexing device.

FIG. 4 shows belt flexing roller device wherein numeral 9 indicates a belt, numerals 10a, 10b indicate belt flexing rollers, numeral 14 indicates a framing, and numeral 15 indicates roller frame. The base part 15a of the roller frame 15 is pivoted for free rotation about an axis 16 to the support plate 14a secured to the framing 14. A pair of foot plates 15b, 15b are mounted at the opposite ends of the roller frame 15 which in turn is adapted to be secured to the framing 14 by means of screw bolts 14b implanted on the framing 14 and nuts 17.

As will be seen from the foregoing description, while the belt is supported in a flat condition when passing through the driving pulley 5, driven pulley 4 and tension pulley 6, it is flexed by degrees into a circular shape by dint of the flexing rollers 10 when it travels into the inside of the tubular covers or guide frames 7, 8. These flexing rollers 10a, 10b are located oppositely on either side of the belt 9 along its way of travel so that the flat belt may be compelled to have a tubular configuration through contact with said rollers 10a, 10b. At the outset, these rollers 10a, 10b are freely rotatable about axis 16 but are then turned at an angle to the framing 14 to conform to the edges of the advancing belt 9. The rollers 10a, 10b thus inclined may then be maintained in this position by tightening the nuts 17. The roller 10a is projected slightly inwardly (i.e. in the direction of the belt) compared with the other roller 10b to tuck the confronting edge of the belt inwardly more forcibly than the roller 10b, so that the belt edges 9b, 9c are lapped one over the other and the belt 9 is flexed to a tubular configuration when traveling inside the tubular covers or guide frames 7, 8.

With rotation of the driving pulley 5, belt 9 is run in the direction indicated by the arrow marks a, b, and the pulverulent or like material is supplied inside the belt which has now been flexed to a tubular configuration and released at the discharge point near the driven pulley 4 while the belt is distended gradually. In this way, according to the belt conveyor system according to the present invention, considerable amount of pulverulent or fine granular material may be conveyed as compared with the other flat-shaped or trough-shaped belt having the same belt width. Moreover, since the belt edges 9a, 9b are lapped one over the other, while the belt has been flexed to a tubular shape, articles being conveyed may be prevented from escaping, and introduction from the outside of raindrops or dust and dirt may be avoided. In addition, by providing tubular covers or guide frames 7, 8, belt may not be exposed directly to the outside through the major part of its travel and there is no necessity of providing a stand or other structure since roller axes may be carried by the brackets 7b, 8b. And, furthermore, since one of the carrier rollers in each group of carrier rollers is formed with enlarged diameter portion 11b, wander or upsetting of the belt may be avoided and the direction of travel of the belt may be converted as desired by having said portion 11b insertedly fitted into the slot 9a formed on the belt 9. If carrier roller 11 with enlarged diameter portion 11b is so mounted that its contacting face will not come in contact with the belt 9, with the exception of the said portion 11b, the belt 9 may not become dislodged when subjected to rolling or bounding motion.

Figure 5:
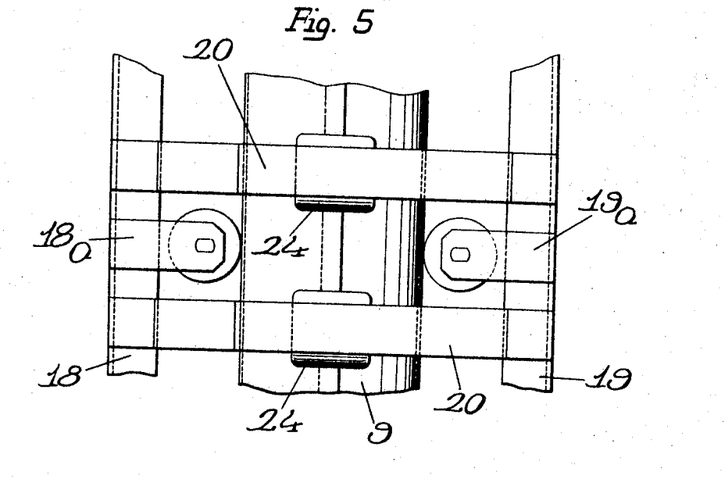
FIG. 5 is a plan view of the intermediate carrier roller device.

FIGS. 4 and 5 show another embodiment of the intermediate carrier roller device for indoor type belt conveyor. In these figures, numerals 18, 19 indicate channel bars, numerals 20, 21 indicate upper and lower support frames, and numerals 22, 23 and 24, 25 indicate snap rollers. The upper and lower support frames 20, 21 are secured respectively at certain desired intervals to the upper and lower parts of the channel bars 18, 19 and carrier rollers 24, 25 are carried by the bearing bars 20a, 21a secured respectively to the upper and lower support frames 20, 21.

Carrier rollers 22, 23 are carried by bearing bars 18a, 19a secured to the channel bars 18, 19 in spaced apart relation to the carrier rollers 24, 25 in the longitudinal direction of the belt 9.

Figure 6:
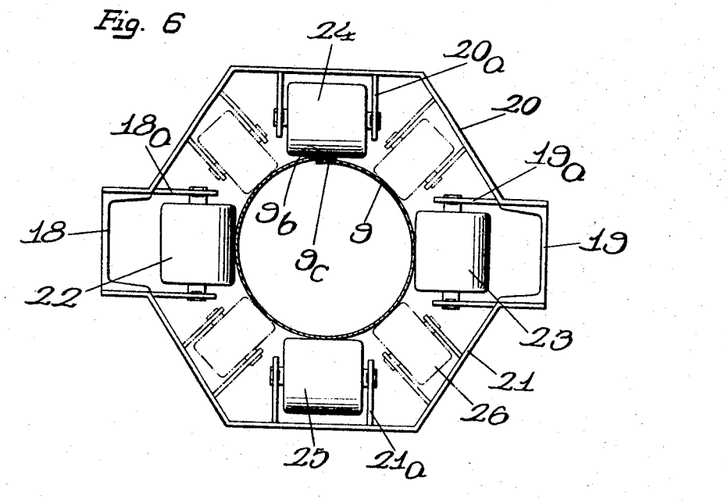
FIG. 6 is a front view of the same.

It will be appreciated from the foregoing description that rollers 22, 23 and rollers 24, 25 are alternately abutted slidingly on the periphery of the belt 9 flexed to a tubular shape respectively on the lateral sides and in the vertical direction thereof, so that the outward aspect of the flexed belt may be varied freely to conform to the loose material contained inside the belt. In this way, according to the belt conveyor of the present embodiment, material may be delivered smoothly compared with the belt conveyor having the similar tubular configuration but contacted at the same point in the longitudinal direction of the belt with four rollers. In FIG. 6, numeral 26 indicates auxiliary rollers provided for tubular-shaped belt having comparatively large sectional area.

Figure 7:
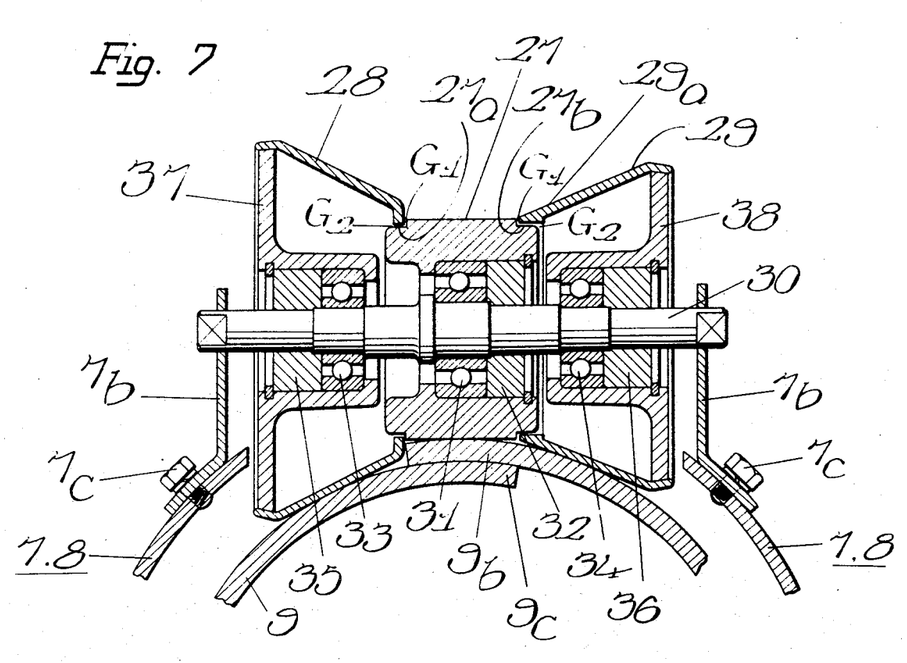
FIG. 7 is a front view shown in vertical section showing a carrier roller or idler according to another embodiment of the intermediate carrier roller or idler device which is adapted to engage with the lapped edges of the belt flexed to a tubular configuration.
Figure 8:
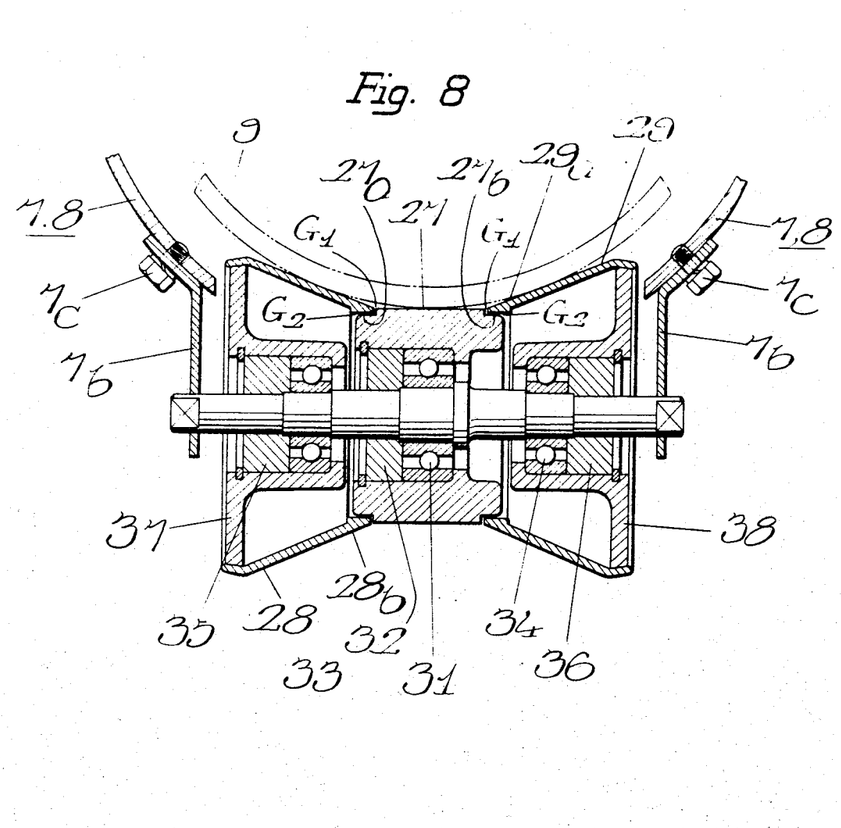
FIG. 8 is a side elevation shown in vertical section showing a carrier roller or idler according to the embodiment of the intermediate carrier roller or idler device of FIG. 7 which is adapted to engage with both lateral faces and the bottom of the belt flexed to a tubular configuration.
Figure 9:
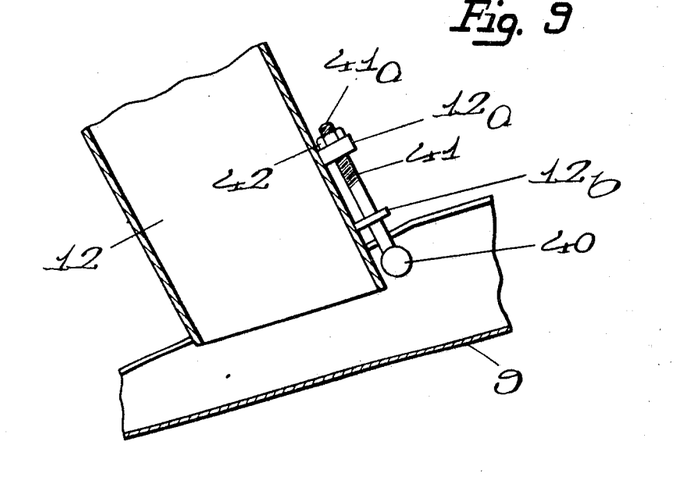
FIG. 9 is a side elevation, shown in vertical section, of the control device for controlling delivery of articles.
Figure 10:
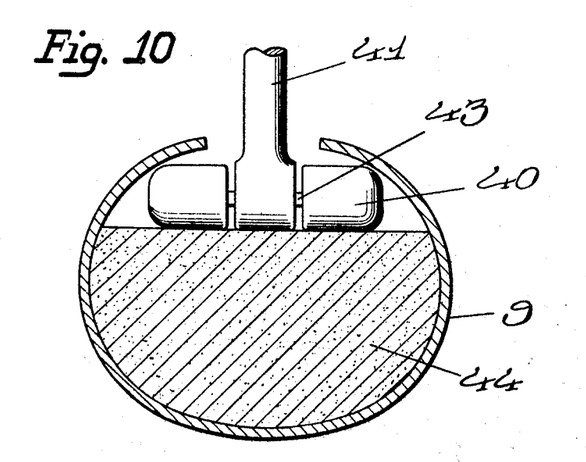
FIG. 10 is a front view of the same, shown in vertical section.
Figure 11:
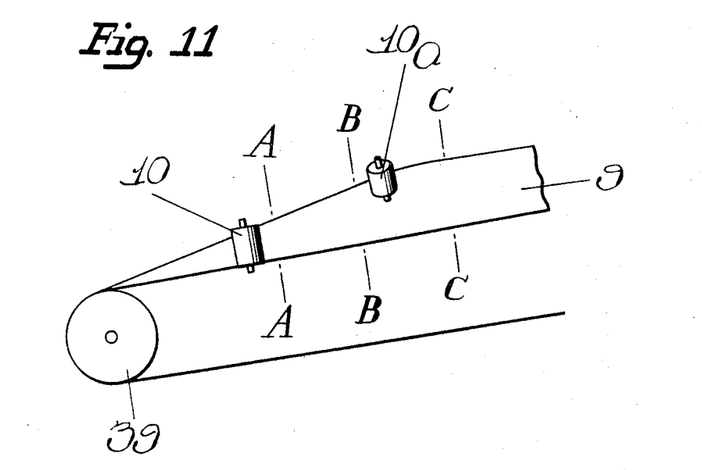
FIGS. 11 and 12 are the explanatory views of the same.
Figure 12:
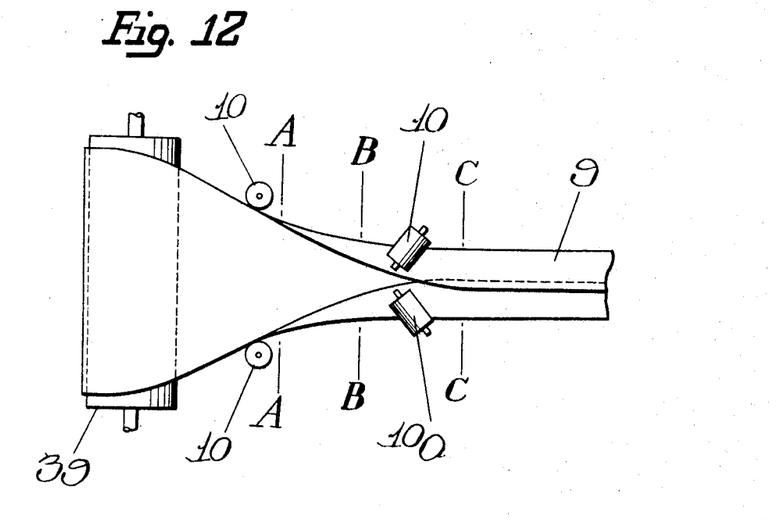

FIGS. 7 and 8 show further embodiment of the intermediate carrier roller device. In these figures, numeral 27 indicates center roller, numerals 28, 29 indicate left-hand and right-hand rollers, and numeral 30 indicates a support shaft. The flat-shaped center roller 27 is provided at both edges thereof with circular recesses or steps 27a, 27b, while the left-hand and right-hand rollers 28, 29 are tapered towards the center roller 27. While rollers 28, 29 as shown in FIG. 8 are of the same diameters, the right-hand roller 29 shown in FIG. 7 has its over-all diameter slightly less than the left-hand roller 28, that is, by approximately the thickness of the belt 9, and the lesser diameter portion of the left-hand roller 28 is bent towards the center roller to form bent edges 28a.

Center roller 27 is mounted on the support axis 30 via ball bearings 31 and seal 32, while the left-hand and right-hand rollers 28, 29 are mounted on the support axis 30 via ball bearings 33, 34, seals 35, 36 and housings 37, 38 respectively.

Numeral 7b indicates brackets, numerals 7, 8 indicate tubular covers or guide frames. Support axis 30 is secured at both ends thereof to the brackets 7b which in turn are secured to the tubular covers or guide frames 7, 8 by bolt nuts 7c. Since the center roller 27 and left-hand and right-hand rollers 28, 29 are mounted separately for free rotation relative to the support axis 30, the number of revolutions of each roller will differ relative to the loads sustained by each roller, and the close contact of each part of the belt with each roller may be ensured. Such close contact may furthermore be improved by having the lapped belt portion abutted on the center roller 27 and the unlapped or single-ply belt portion abutted on the left-hand and right-hand rollers 28, 29 and, moreover, the lapped belt portion may thereby be held more positively in its entirety.

In the construction shown in FIG. 7, the bent edges 28a of the left-hand rollers 28 is superimposed on the circular recess or step 27a of the center roller 27 with a small gap G between, while the lesser diameter portion 29a of the right-hand roller 29 is superimposed on the circular recess or step 27b of the center roller 27 likewise with small gaps of interspaces $G_1$, $G_2$ between. On the other hand, in the construction shown in FIG. 8, the lesser diameter portions 28a, 29a of the left-hand and right-hand rollers 28, 29 are superimposed on the circular recesses or steps 27a, 27b with small gaps or interspaces $G_1$, $G_2$ between, so that entrance of dust and dirt may be avoided effectively.

FIGS. 9 to 12 show an embodiment of the central device for articles being conveyed. In this embodiment, pulverulent or fine granular material is not supplied to the portion of the belt 9 flexed to a true tubular shape, but is supplied from the chute to the slightly flexed portion thereof. In this instance, various inconveniences are caused to the flexing of the belt 9 which ought to be flexed to a tubular shape as indicated at C—C. This sectional area of any part defined by the line A—A on one part and by the line B—B on the other is appreciably larger than that on the line C—C. For instance, the sectional area of the belt portion on the line C—C may be 1.6 times as large as that of any part of the partly flexed belt portion, which will cause many hindrances to the smooth flexure of the belt. The present embodiment is intended to eliminate this drawback. In the figures, numeral 39 indicates driving or driven pulley, numeral 10 indicates flexing roller, numeral 10a indicates flexing roller already explained with reference to FIG. 4 and projected towards the belt more pronouncedly than the roller 10, numeral 40 indicates control roller, numeral 41 indicates support rod inserted through the lugs 12a, 12b provided on the edges of the chute vertically adjustably by means of a nut screwed to its threaded portion 41a. An axis 43 is mounted horizontally on the lower part of the support rod 41 and left-hand and right-hand rollers 40 are mounted rotatably on this axis 43. These control rollers 40 are disposed at the desired height inside the belt 9 being flexed from the flat to the tubular shape and the head portions of the control rollers are milled to an arcuate shape to conform to the internal surface of the belt 9. Numeral 44 indicates pulverulent material being conveyed. In this embodiment, even if considerable amount of pulverulent or like material is supplied onto the belt 9 from the feed chute, the same may be prevented from entering the inside of the belt flexed to a tubular shape and, as a result, both edges of the belt 9 may be maintained in the lapped state positively. Moreover, since undue mechanical force may not be exerted to the belt conveyor system, belt life may be prolonged appreciably.

Figure 13:
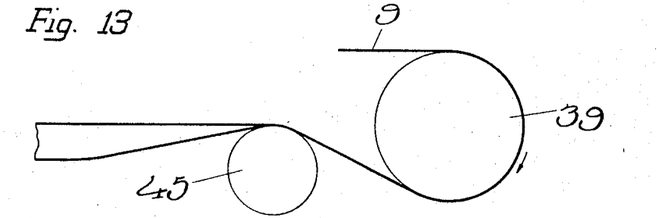
FIG. 13 is a diagrammatic side elevation showing a drum-shaped snap roller as it is being used.
Figure 14:
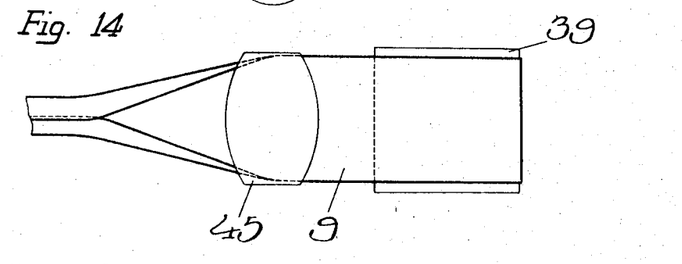
FIG. 14 is a bottom plan view of the same.
Figure 15:
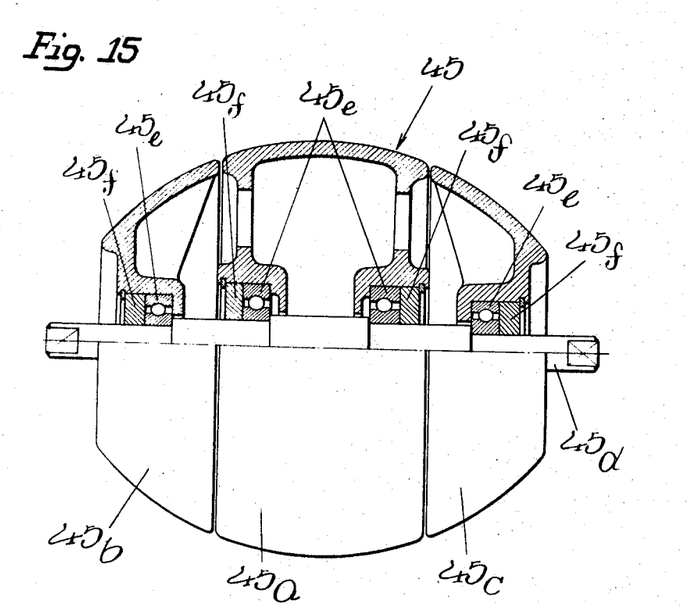
FIG. 15 is a front view, partly cut away, of the drum-shaped snap roller.

FIGS. 13 to 15 show drum-shaped snap roller and the manner in which the same is to be used. Numeral 39 indicates driving or driven pulley, numeral 9 a belt, numeral 45 a drum-shaped snap roller comprising a center roller 45a, left-hand and right-hand rollers 45b, 45c and a support axis 45d.

Each of the rollers 45a, 45b, 45c has an arcuate peripheral surface and the snap roller is formed in its entirety in a drum-like configuration. Each of the rollers 45a, 45b, 45c are mounted for free rotation about support axis 45d via ball bearings 45e and seals 45f. By using the snap roller of the present embodiment in the manner as illustrated in FIGS. 13 and 14, tensile force that may be exerted to both edges of the belt 9 being flexed from the flat to the tubular shape may be prevented and hence the difference in belt speed on any part of the belt surface may be avoided.

Figures 19, 20:
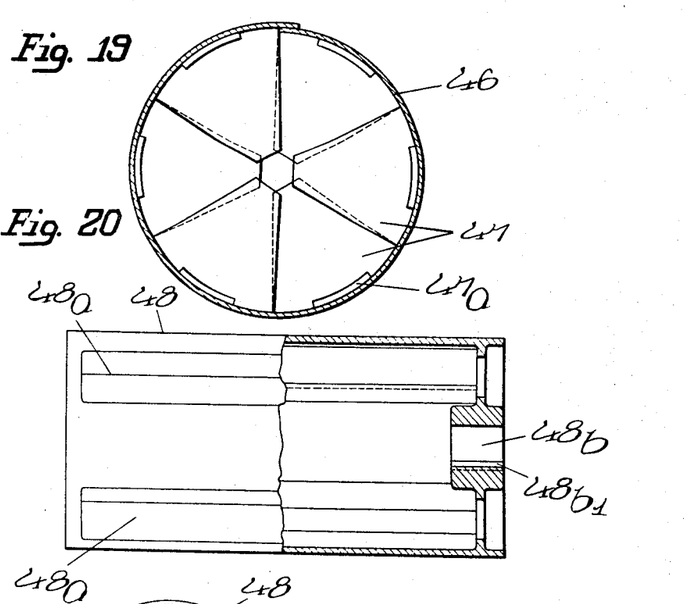
FIG. 19 is a front view of the same as it is flexed to a tubular configuration.
FIG. 20 is a front view, party cut away, of the snap roller according to FIG. 16.

FIGS. 16 to 21 show belt conveyor using a belt provided with fin plates. In the figures, numeral 46 indicates a belt, and numeral 47 indicates fin plates. Belt 46 is so made as to be flexed into tubular shape with its edges lapped one over the other as illustrated in FIG. 19.

Figures 16, 17, 18:
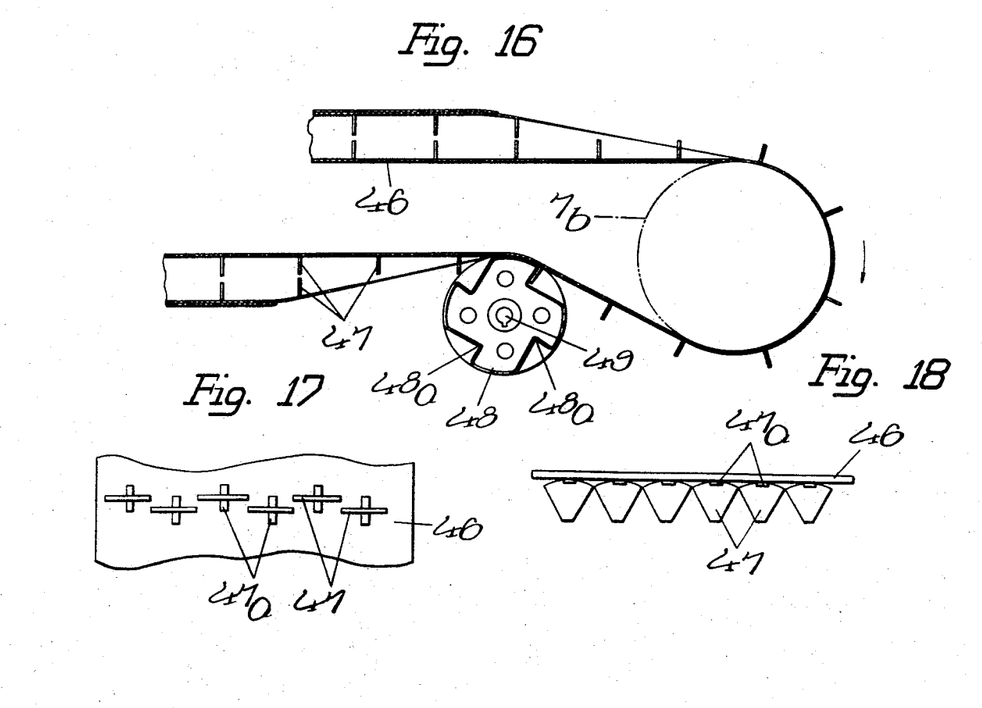
FIG. 16 is a side elevation shown in vertical section showing another embodiment of the snap roller as it is being used with a belt provided with fin plates.
FIG. 17 is a top plan view of the belt provided with fin plates.
FIG. 18 is a front view of the same.

In front elevation, fin plate 47 has an arcuate shape at its bottom, with the exception of its central portion, and a trapezoidal shape at its upper portion. Lug 47a is provided crosswise on the central portion of the fin plate 47, while the arcuate portion of the fin plate 47 is so made as to conform to the periphery of the belt 46 flexed to a tubular shape. Fin plates 47 are arranged side-by-side on the belt 46 transverse to the lengthwise direction thereof and adfixed at its central portion to the lugs 47a provided on the upper surface of the belt 46. Fin plates 47 adfixed at its central portion to the lugs 47a are arranged in staggered relation transverse to the lengthwise direction of the belt in such manner that both edges thereof are lapped one over the other as the belt 46 is flexed to a tubular shape. The effects of reinforcement are obtainable by having the fin plates 47 lapped one over the other at both edges thereof and the belt may be enabled to withstand loads to a considerable extent.

The abovementioned fin plates provided transverse to the longitudinal direction of the belt 46 are furthermore provided in as many rows as desired with adequate interspaces between in the longitudinal direction of the belt 46.

By using a belt provided with fin plates, granular material may be delivered on the steep upgrade with high efficiency without reversal of the material in transit.

Figure 21:
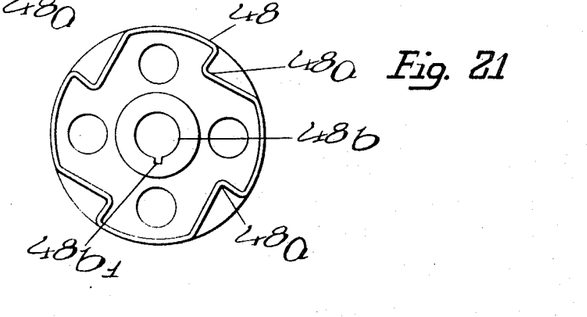
FIG. 21 is a side elevation thereof, shown in vertical section.

By numeral 48 is designated a snap roller provided on its periphery with the desired number of recesses 48a and the snap roller 48 is secured to its rotary axis 49 by having a key on the axis 49 insertedly fitted into a corresponding keyway 48b, on the central bore 48b thereof. By numeral 7b is designated driving or driven pulley. It will be appreciated that snap roller 48 may be used to its best advantage with the belt provided with fin plates 47 since its recesses 48a will engage with fin plates 47 and its peripheral part will abut on the portion of the belt not provided with fin plates.

Although description of the present invention has been made with reference to certain embodiments thereof, it is to be noted that the same is not limited thereto but may comprise all other structures coming within the spirit and scope of the invention defined in the appended claims.

What is claimed is:

1. A belt conveyor system for pulverulent and fine granular material and the like, comprising a pair of spaced pulleys, an endless flat belt arranged to pass over and to be driven by said pulleys, roller means for flexing said belt from its flat shape into a tubular shape for a portion of its path of travel between said pulleys, said belt in its tubular shape having one longitudinal edge disposed in overlapping relationship to the other longitudinal edge thereof with the opposed surfaces of said belt at the longitudinal edges disposed in contacting relationship, a tubular cover enclosing said belt in its tubular shape, and carrier rollers mounted in said tubular cover in a number of spaced positions for supporting said belt during its passage through said tubular cover.

2. A belt conveyor system, as set forth in claim 1, wherein said roller means are mounted relative to the axis of travel of said belt for urging one longitudinal edge thereof inwardly toward the axis to a greater degree than the other longitudinal edge thereof for effecting the overlapping relationship of the longitudinal edges.

3. A belt conveyor system, as set forth in claim 1, wherein each of said carrier rollers comprises three separate rollers mounted in side-by-side relationship and each arranged to be freely rotatable on a common shaft, a number of said carrier rollers contacting the outer periphery of said belt about its circumference in each of said supporting positions.

4. A belt conveyor system, as set forth in claim 3, wherein each of said carrier rollers comprised of three separate rollers has a substantially concave shape in contact with the periphery of said belt, and wherein the left-hand and right-hand rollers are superimposed on their inner edges on the adjacent edges of the center roller with small interspaces therebetween.

5. A belt conveyor system, as set forth in claim 4, wherein one of the left-hand and the right-hand rollers on the opposite sides of the center roller has its over-all diameter slightly less than the roller on the other side of the center roller, and the center roller is arranged to contact the outer surface of the overlapping longitudinal edge of said belt.

6. A belt conveyor system, as set forth in claim 1, wherein the outer surface of said belt contacting said carrier rollers has a longitudinally extending guide slot therein, and at least one of said carrier rollers has a circumferentially extending protuberance thereon arranged to fit within said guide slot.

7. A belt conveyor system, as set forth in claim 1, wherein at the spaced positions of said carrier rollers the adjacent said carrier rollers in the circumferential direction about said belt are spaced apart in the longitudinal direction of said belt.

8. A belt conveyor system, as set forth in claim 1, wherein means for feeding material to said belt to be conveyed thereby is located between one of said pulleys and the adjacent end of said tubular cover.

9. A belt conveyor system, as set forth in claim 8, wherein said means for feeding material includes a feed chute for charging material onto said belt, and a control roller disposed between said chute and said tubular cover and aligned above said belt in its partly flexed position between the flat shape and the tubular shape for regulating the amount of material being transported by said belt.

10. A belt conveyor system for pulverulent and fine granular materials and the like comprising a pair of spaced pulleys, an endless flat belt arranged to pass over and to be driven by said pulleys, said belt in its passage between said pulleys having a material transport path of travel and a return path of travel, the material transport path of travel having a material charging end adjacent one of said pulleys and a material discharging end adjacent the other said pulley, roller means located adjacent the charging end of the material transport path of travel for flexing said belt from its flat shape after it passes over said pulley to a tubular shape for conveying materials to the material discharging end thereof, roller means at the material discharging end of said path of travel for gradually converting the belt from its tubular shape to its flat shape prior to passage of said belt about said pulley, a tubular cover enclosing said belt between its material charging end and material discharging end, and a plurality of carrier rollers mounted in said tubular cover in a number of spaced support positions for supporting the tubular-shaped belt during its passage through said tubular cover, roller means located at the opposite ends of said belt in its return path of travel for converting said belt from its flat shape after its passage over said pulley to a tubular shape for the major portion of its return path and then converting the said belt back to its flat shape prior to its passage over the other said pulley, a tubular cover enclosing said belt in its tubular shape during the course of its return path, and a pair of tension pulleys cooperating with said pulleys for applying tension to said belt in the course of its travel over said pulleys.

11. A belt conveyor system, as set forth in claim 10, wherein the circumferential surfaces of said tension pulleys are arranged to contact the longitudinally extending central portion of said belt applying a tensile force thereto and to be out of contact with the longitudinal edge portions of said belt whereby said longitudinal edge portions do not receive a tensile force from said tension pulley.

12. A belt conveyor system, as set forth in claim 1, wherein the surface of said belt forming the inner surface of said tubular shape thereof has a plurality of fin plates attached thereto, said fin plates disposed transversely to the longitudinal center line of said belt and located in a number of longitudinally spaced positions along said belt.

13. A belt conveyor system, as set forth in claim 12, wherein said fin plates disposed in each of said transverse positions have the adjacent fin plates staggered in the longitudinal direction whereby as said belt is flexed into its tubular shape the fin plates overlap at their edges forming a closure for the passage through said tubular shaped belt.

14. A belt conveyor system, as set forth in claim 13, wherein a roller is disposed adjacent at least one of said pulleys for supporting the fin containing surface of said belt as it leaves said pulley, said roller having recesses formed in its circumferential periphery for receiving said fin plates disposed on the surface of said belt.

15. A belt conveyor system, as set forth in claim 1, wherein said roller means comprises a drum-like roller having a convex periphery and is formed of three separate roller members each arranged for free rotation about a support axis, the middle roller member having a greater outside diameter than said outside roller members.

References Cited

UNITED STATES PATENTS 3,338,383   8/1967   Hashimoto _________ 198—204

FOREIGN PATENTS 796,295   1/1936   France.
867,517   2/1953   Germany.
1,358,636   3/1964   France.

EDWARD A. SROKA, *Primary Examiner.*